No. 888,523.

PATENTED MAY 26, 1908.

S. BRAMLEY-MOORE.
FRICTION CLUTCH.
APPLICATION FILED FEB. 23, 1907.

3 SHEETS—SHEET 1.

WITNESSES:
G. V. Lymes.
Edward S. George.

INVENTOR.
S. Bramley-Moore.
By Robert B. Phillips
Attorney.

No. 888,523. PATENTED MAY 26, 1908.
S. BRAMLEY-MOORE.
FRICTION CLUTCH.
APPLICATION FILED FEB. 23, 1907.

3 SHEETS—SHEET 2.

WITNESSES:
G. V. Lymes.
Edward L. George.

INVENTOR.
S. Bramley-Moore.
By Robert P. Phillips
Attorney.

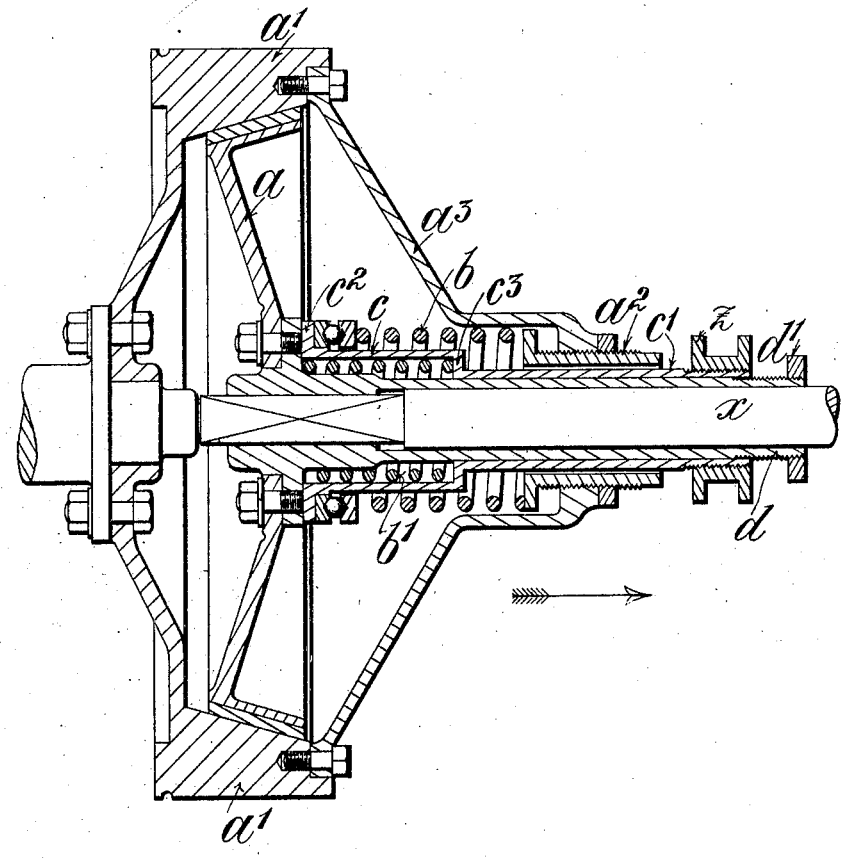

UNITED STATES PATENT OFFICE.

SWINFEN BRAMLEY-MOORE, OF LONDON, ENGLAND.

FRICTION-CLUTCH.

No. 888,523.        Specification of Letters Patent.        Patented May 26, 1908.

Application filed February 23, 1907. Serial No. 358,900.

*To all whom it may concern:*

Be it known that I, SWINFEN BRAMLEY-MOORE, a subject of the King of Great Britain and Ireland, and residing at 26 Russell Square, Bloomsbury, in the county of London, England, have invented a new and useful Improvement in Friction-Clutches, of which the following is a specification.

This invention relates to friction clutches, the two members of which each have a single frictional surface, more particularly those employed in motor road vehicles to couple the motor to the transmission gear, and it consists essentially in the employment with the spring or springs usually employed to keep the two parts of the clutch in engagement, of one or more auxiliary springs which operate with the main spring or springs—through an intermediate piece—to get the clutch, the arrangement being such that when the mechanism for withdrawing the movable part of the clutch out of engagement with the other part thereof is operated its first movement increases the pressure of one spring or set of springs and decreases that of the other and its final movement withdraws the movable part of the clutch out of engagement with the other part thereof, the object being to obtain a gradual engagement of the two parts of the clutch so as to pick up the load without shock and to positively break the connection of the clutch when the frictional contact of the parts is insufficient to transmit any power so as to stop the rotation of the movable part of the clutch which is essential to effecting a change of the ratio of gearing when a velocity ratio gear is employed.

Figure 1:
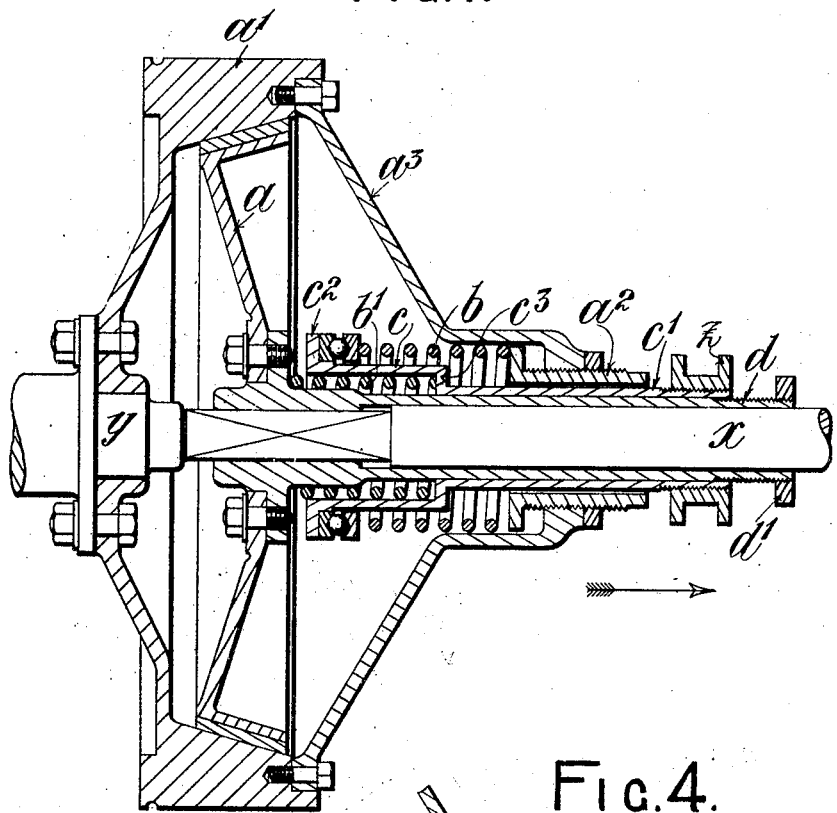
Figure 4:
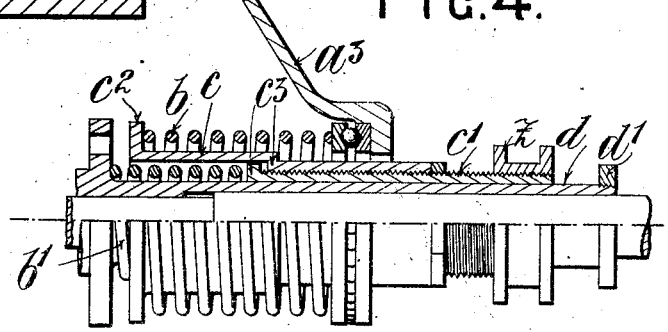
Figure 2:
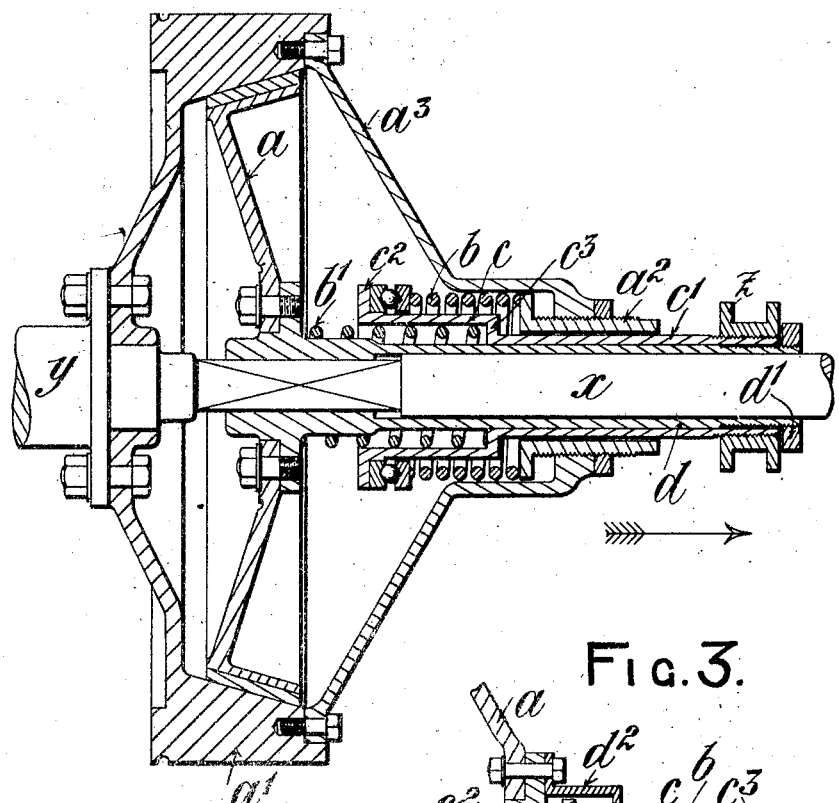

In the accompanying drawings which show—by way of illustration—some methods of applying this invention to clutches employed in motor road vehicles:—Figure 1, Sheet No. 1, is a view in sectional elevation showing one form the invention may assume when applied to an ordinary cone clutch, the two parts of the clutch being shown in driving engagement; Fig. 2, Sheet No. 2, is a view in sectional elevation showing the same construction with one of the springs compressed so that its influence is removed from the clutch, the movable part of the clutch being kept in engagement with the other part by the other spring which has been allowed to expand and so reduce the pressure it exerts;
Fig. 3, Sheet No. 2, is a broken view in sectional elevation showing a modification of one of the elements; Fig. 4, Sheet No. 1, is a broken view in elevation—partly in section—showing another modification of one of the elements; Fig. 5, Sheet No. 3, is a view in sectional elevation of a modification of the construction shown by Figs. 1 & 2.

Throughout the views similar parts are marked with like letters of reference.

Figure 3:
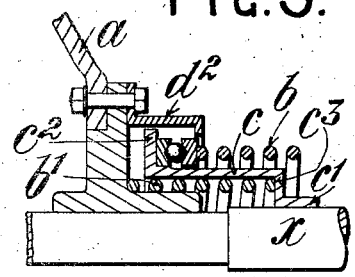

Referring to Figs. 1 & 2, which show the application of the invention to an ordinary cone clutch in which one part $a^1$ thereof is fixed on the driving axle $y$ and the other $a$ thereof is mounted to slide on the driven axle $x$, the two springs $b$ and $b^1$ are arranged to act on the movable part $a$ of the clutch through an intermediate piece $c$ carried by a sleeve $c^1$ mounted to slide on a sleeve $d$ formed on or fixed to the said movable part $a$ of the clutch, the intermediate piece having an external flange $c^2$ at one end and an internal flange $c^3$ at the other end. The spring $b$ is located between the flange $c^2$ of the intermediate piece $c$ and an adjustable sleeve $a^2$ carried by an extension piece $a^3$ fixed to the part $a^1$ of the clutch, and the spring $b^1$ is located between the flange $c^3$ of the intermediate piece $c$ and the boss of the movable part $a$ of the clutch. These springs are of equal strength so that they act together as shown in Fig. 1 to keep the two parts $a$ & $a^1$ of the clutch engaged. The movement to operate the clutch is transmitted from the controlling foot lever to the sleeve $c^1$ in the ordinary way, or any other convenient manner, the said sleeve $c^1$ being shown in the drawing as fitted with a grooved collar $z$ with which the usual forked lever engages. On the end of the sleeve $d$ is fixed a collar $d^1$ with which the end of the sleeve $c^1$ carrying the intermediate piece $c$ contacts after the pressure of the springs $b$ and $b^1$ is removed from the movable part $a$ of the clutch, and thus operates to mechanically withdraw the said movable part of the clutch out of engagement with the other part $a^1$ thereof. Instead of the collar $d^1$ being fixed on the end of the sleeve $d$ an overhanging flange $d^2$ may be fixed on the movable part $a$ of the clutch so as to engage a flange $c^2$ on the inner end of the intermediate sleeve $c$ as shown in Fig. 3, in which construction the intermediate sleeve or piece may be mounted directly on the driven axle.

The action of the clutch is as follows:—
When the sleeve $c^1$ carrying the intermediate piece $c$ is moved in the direction of the arrow shown in Figs. 1 and 2, to release the clutch the spring $b$ is compressed, whereby the pressure of the said spring is immediately removed from the part $a$ of the clutch, and the spring $b^1$ is allowed to expand, thereby gradually reducing the pressure of said spring on the movable part $a$ of the clutch. When the spring $b^1$ has expanded to such an extent that it no longer exerts sufficient pressure to enable power to be transmitted through the clutch the part $a$ may be positively withdrawn from the part $a^1$ by causing the end of the sleeve $c^1$, or the collar $z$ thereon, to contact the collar $d^1$ on the sleeve $d$, and thus withdraw the movable part of the clutch. In reëngaging the clutch the return movement of the sliding sleeve $c^1$ carrying the intermediate piece $c$ allows the spring $b^1$ to gradually increase in strength and thus gradually pick up the load, until the pressure of the two springs becomes balanced when they operate together to keep the two parts of the clutch in engagement.

In the construction illustrated by Figs. 1 and 2 it is necessary, owing to the spring $b$ operating through the spring $b^1$, to give the intermediate sleeve $c$ a considerable travel, and as this is not always convenient the two springs may be arranged to act or operate independently as shown in Fig. 5, in which construction the inner end of the sleeve $c$ contacts the boss of the movable part $a$ of the clutch, when the spring $b$ is operating to keep the two parts of the clutch in engagement. This allows of the spring $b^1$ being made lighter than the spring $b$ and therefore reduces the amount of travel to be given to the sleeve $c$ to permit of the full expansion of the said spring $b^1$. To enable the pressure exerted by the springs $b$ and $b^1$ to be varied the intermediate piece $c$ may be made in two pieces screwed or otherwise coupled together so as to provide for longitudinal adjustment of the two flanges $c^2$ $c^3$ as shown by Fig. 4.

In the construction shown by Fig. 6 the two springs $b$ and $b^1$ encircle an extension of the shaft $y$ and the sliding sleeve $c$ is mounted freely on said extension. The sleeve $c$ carries arms $c^3$ which pass through slots $d^3$ in a sleeve $d$ formed on or fixed to the movable part $a$ of the clutch and to which the shaft to be driven is coupled, the said arms $c^3$ carrying a grooved collar $z$ through which the clutch is operated. To positively withdraw the movable part $a$ of the clutch from the other part $a^1$ the arms $c^2$ carried by the sleeve $c$ engage the ends of the slots $d^3$ in the sleeve $d$.

What I claim as my invention, and desire to secure by Letters Patent is:—

1. The combination in a friction clutch of the single cone type, of a part fixed to the driving shaft, a movable part carried by a sleeve mounted to slide on the driven shaft, an intermediate piece located between the two parts of the clutch, a spring operating between the said intermediate piece and the movable part of the clutch, a second spring operating between the said intermediate piece and the part of the clutch carried by the driving axle, a stop carried by the movable part of the clutch, a sleeve carrying the intermediate piece, and a grooved collar carried by the said sliding sleeve, as set forth.

2. The combination in a friction clutch of the single cone type, of a part fixed on the driving shaft, a part mounted to slide on the driven shaft, a sleeve forming part of said movable part of the clutch an intermediate piece carried by a sleeve adapted to slide in relation to the movable part of the clutch, a spring operating between the said intermediate piece and an abutment fixed in longitudinal relation to the part of the clutch on the driving shaft so as to keep the said intermediate piece in contact with the disengaging part of the clutch, a second spring operating between the said sliding piece and the disengaging part of the clutch, and a stop or collar carried by the movable part of the clutch with which the end of the sleeve carrying the intermediate piece contacts, as set forth.

3. The combination in a friction clutch of the cone type, of a part fixed on the driving shaft, a part mounted to slide on the driven shaft, a sleeve forming part of the said movable part of the clutch, an intermediate piece carried by a sleeve adapted to slide on the movable part of the clutch, a grooved collar in relation to said sliding piece, a spring operating between the said sliding piece and an abutment fixed in longitudinal relation to the part of the clutch on the driving shaft so as to keep the said sliding piece in contact with the disengaging part of the clutch, a second spring operating between the said sliding piece and the disengaging part of the clutch, a stop or collar on the end of the sleeve of the movable part of the clutch with which the end of the sleeve carrying the intermediate piece contacts, and of means for operating the intermediate piece, as set forth.

4. The combination in a friction clutch of the single cone type, of a part fixed to the driving shaft, a movable part carried by a sleeve mounted to slide on the driven shaft, an intermediate piece sliding in relation to the movable part of the clutch, a spring operating between the intermediate piece and the movable part of the clutch, a second spring operating between the intermediate piece and the part of the clutch carried by the driving shaft, a stop carried by the movable part of the clutch, a flange carried by the sliding intermediate piece, and a grooved collar carried by the sliding piece, as set forth.

5. The combination in a friction clutch of the single cone type, of a part fixed on the driving shaft, a part mounted to slide on the driven shaft, a sleeve forming part of the said disengaging part of the clutch, an intermediate piece carried by a sleeve adapted to slide in relation to the movable part of the clutch, a spring operating between the said intermediate piece and an abutment fixed in longitudinal relation to the part of the clutch on the driving shaft so as to keep said intermediate piece in contact with the disengaging part of the clutch, a second spring operating between the said intermediate piece and the disengaging part of the clutch, and a stop carried by the disengaging part of the clutch with which a flange carried by the sliding intermediate piece contacts, as set forth.

6. The combination in a friction clutch of the cone type, of a part fixed on the driving shaft, a disengaging part mounted to slide on the driven shaft, a sleeve forming part of the said disengaging part of the clutch, an intermediate piece carried by a sleeve adapted to slide in relation to the movable part of the clutch, a grooved collar on said sliding piece, a spring operating between the said sliding piece and an abutment fixed in longitudinal relation to the part of the clutch on the driving shaft so as to keep the said sliding piece in contact with the disengaging part of the clutch, a second spring operating between the said sliding piece and the disengaging part of the clutch, a stop carried by the disengaging part of the clutch with which a flange on the sliding intermediate piece contacts, and means for operating the intermediate piece, as set forth.

SWINFEN BRAMLEY-MOORE.

Witnesses:
ROBERT E. PHILLIPS,
G. V. SYMES.